United States Patent
Scherson

(10) Patent No.: US 6,368,488 B1
(45) Date of Patent: Apr. 9, 2002

(54) MODIFIED PLATINUM SUBSTRATES FOR OXYGEN REDUCTION

(75) Inventor: Daniel A. Scherson, University Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 09/623,339
(22) PCT Filed: Mar. 12, 1999
(86) PCT No.: PCT/US99/05726
§ 371 Date: Nov. 15, 2000
§ 102(e) Date: Nov. 15, 2000
(87) PCT Pub. No.: WO99/46429
PCT Pub. Date: Sep. 16, 1999

Related U.S. Application Data
(60) Provisional application No. 60/077,762, filed on Mar. 12, 1998.

(51) Int. Cl.[7] ................................. C25B 1/28
(52) U.S. Cl. ............... 205/472; 205/466; 204/252; 204/263; 204/265; 204/266; 204/290.01; 204/290.11; 204/290.14
(58) Field of Search ............ 204/290.01, 290.14, 204/290.11, 252, 263, 265, 266; 205/466, 472

(56) References Cited

U.S. PATENT DOCUMENTS

| 4,067,787 A | * | 1/1978 | Kastening et al. | 205/466 |
| 5,112,702 A | * | 5/1992 | Berzins et al. | 205/466 |
| 5,647,968 A | * | 7/1997 | Fraser et al. | 205/466 |
| 5,695,622 A | * | 12/1997 | Fraser et al. | 204/290.14 |
| 6,254,762 B1 | * | 7/2001 | Uno et al. | 205/466 |

* cited by examiner

*Primary Examiner*—Bruce F. Bell
(74) *Attorney, Agent, or Firm*—Fay, Sharpe, Fagan, Minnich & McKee, LLP

(57) ABSTRACT

An electrode (10, 112) containing platinum has its surface modified with sulfur, tellurium, or selenium, or compounds thereof, which renders the surface highly selective for the conversion of oxygen to hydrogen peroxide. The high selectivity of the electrode, and its ability to function in acidic electrolytes make it suitable to a variety of electrochemical processes. In a preferred embodiment, an oxygen concentration device (A) incorporating the electrode as a cathode (10) also includes an anode (12) and a selective membrane (14), formed from a solid polymer electrolyte material, between the anode and the cathode. An oxygen-containing atmosphere is brought into contact with the cathode where it is converted to hydrogen peroxide. The hydrogen peroxide passes through the membrane to the anode where it is reconverted to purified oxygen.

10 Claims, 4 Drawing Sheets

MODIFIED PLATINUM SUBSTRATES FOR OXYGEN REDUCTION

This application is a 371 of PCT/US99/05726 filed on Mar. 12, 1999 which claims benefit of provisional application no. 60/077,762 filed on Mar. 12, 1998.

BACKGROUND OF THE INVENTION

The present invention pertains to the electrochemical arts, in the reduction of oxygen to hydrogen peroxide. It finds particular application in the field of concentration, and more particularly in concentrating oxygen from a gaseous mixture, such as air, according to an electrochemical device and method, and will be described with particular reference thereto. It should be appreciated, however, that the invention can be applied to other areas not set forth herein, particularly where concentrated oxygen or hydrogen peroxide is desired.

There is a need for providing substantially undiluted oxygen in a variety of medical, industrial, aeronautical, and space exploration situations. Numerous electrochemical methods and devices are known in the art for concentrating oxygen. Such known electrochemical devices and methods for generating oxygen are based on electrolysis using solid polymer electrolyte (SPE) technology, static feed $H_2O$ electrolysis subsystems (SFWES), or the less-developed electrolysis of carbon dioxide. The power consumption of these processes is often high, typically 100–200 W/kg of oxygen generated per day. Conventional electrochemical oxygen generators are based upon the electrolysis of water, a 4-electron process.

U.S. Pat. No. 5,338,412 discloses an electrochemical device and method for the selective removal and regeneration of oxygen from the ambient atmosphere. The device is based on the use of a two electrode system separated by a thin layer of liquid or solid electrolyte. An external potential difference is applied between the two electrodes to promote the reduction of oxygen to hydrogen peroxide at the cathode. The hydrogen peroxide is then reoxidized at the anode to yield gas-phase purified oxygen. Hence, if the cathode is exposed to the atmosphere and the anode is exposed to an enclosed environment, the device will selectively enrich the enclosed environment with oxygen.

The electrochemical reduction of oxygen to peroxide under alkaline conditions is a highly reversible process occurring at a high exchange current density. Isotopic studies of the cathodic reduction of $O_2$ to $HO_2^-$ and the reverse anodic process on high-area porous carbons and alkaline solutions demonstrate that the oxygen-oxygen bond is not ruptured during these reactions. For instance, an E° value on carbon for the $O_2/HO_2^-$ couple in alkaline solutions has been determined to be –0.048 V. Polarographic measurements on mercury provide E°=–0.045 V.

In contrast, the electrochemical reduction of $O_2$ to $H_2O$ or $OH^-$, and the electrolysis of water under acidic or alkaline conditions, are irreversible processes. Such processes are highly dependent on the catalytic capability of the electrode material for facilitating oxygen-oxygen bond breaking (reduction) or bond making (oxidation).

Cell voltages are dependent upon the activation overpotentials at the electrodes and on the IR contributions of the separator, electrode components, solution and electrical connections. Mixed electrochemical processes, cause by inefficiencies resulting from catalytic decomposition of peroxide and $O_2$ formation from electrolysis of water instead of peroxide, will raise the cell voltage if uncontrolled. By minimizing these inefficiencies, the overall cell voltage will be close to zero volts.

The oxygen concentration device is well suited for applications in areas where oxygen is continuously consumed in or by the enclosed environment. Power consumption is anticipated to be around 40–50 W/kg $O_2$ per day.

For the device described in U.S. Pat. No. 5,338,412 to operate with an acidic electrolyte such as Nafion, the cathode should be compatible with the acid media. Few materials have been found which are capable of catalyzing the reaction of oxygen to hydrogen peroxide in such acidic conditions. Strbac et al. disclose the conversion of oxygen to hydrogen peroxide on various crystal faces of gold, including Au(100), Au(311), and Au(210), in acidic electrolytes (S. Strbac and R. Adzic, J. Serbian Chem. Soc. 57 (12) 835–848 (1992)). They found the highest activity on Au(100) in sulfuric acid (pH 1), where the onset of the reaction was at about 0.6V vs a standard hydrogen electrode(SHE). However, few of the single crystal faces of gold show a high specificity for the conversion of oxygen to hydrogen peroxide. This lack of specificity makes the formation of a high surface area gold catalyst difficult since it is extremely hard to achieve the preferred crystallographic orientation over the entire surface.

The present invention provides a new and improved method and apparatus for the selective conversion of oxygen to hydrogen peroxide in acidic media which overcomes the above-referenced problems, and others. The subject new electrode and method for its application may lead to inexpensive sources of pure oxygen for medical uses and, on a larger scale, for industrial applications such as steel production or glass manufacturing.

SUMMARY OF THE INVENTION

In accordance with one aspect of the present invention, an electrode which is selective for reduction of oxygen is provided. The electrode comprises a substrate which includes platinum, and is characterized by the substrate having a surface modified with a layer of a substance selected from the group consisting of sulfur, selenium, and tellurium, compounds of sulfur, selenium, and tellurium, and combinations thereof.

In accordance with another aspect of the present invention, an electrochemical device for concentrating oxygen from a feed gas including oxygen is provided. The electrochemical device comprises a cathode for reducing oxygen in the feed gas to peroxide, an anode for oxidizing the peroxide to oxygen, a separator between the anode and the cathode for selectively diffusing the peroxide therethrough, and a source of a potential difference connected with the cathode and the anode. The device is characterized by the cathode including a platinum-containing substrate which has a surface modified with a substance selected from the group consisting of sulfur, selenium, and tellurium, compounds of sulfur, selenium, and tellurium, and combinations thereof.

In accordance with another aspect of the present invention, a method of converting oxygen in an oxygen-containing atmosphere to peroxide with a high degree of specificity is provided. The method is characterized by modifying the surface of a platinum-containing electrode with a substance selected from the group consisting of sulfur, selenium, and tellurium, compounds of sulfur, selenium, and tellurium, and combinations thereof, and contacting the electrode surface with the atmosphere.

One advantage of the present invention is that it enables the conversion of oxygen to hydrogen peroxide in acidic electrolytes.

Another advantage of the present invention is that it provides for an oxygen concentration device having a low power consumption at higher rates of oxygen production.

Yet another advantage of the present invention is that the electrode is highly selective for the conversion of oxygen to hydrogen peroxide, even when the electrode is partially deactivated.

Still further advantages of the present invention will become apparent to those of ordinary skill in the art upon reading and understanding the following detailed description of the preferred embodiments.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof.

FIG. 4A: disk current,

FIG. 4B: ring current, and

FIG. 4C: yield of hydrogen peroxide at the disk as a function of the applied potential;

DETAILED DESCRIPTION OF THE PREFERRED EMBODIMENTS

Figure 1:
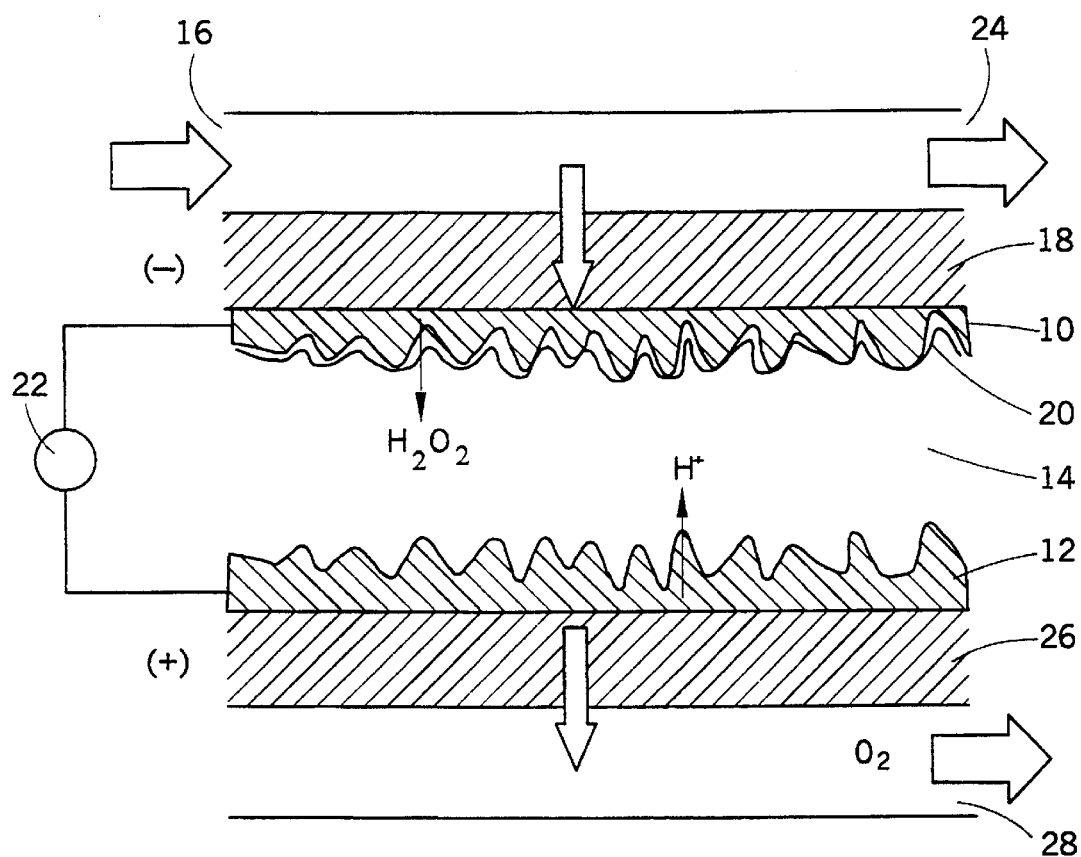
FIG. 1 is a schematic representation of a side section of an oxygen concentrator incorporating a modified platinum electrode in accordance with a first embodiment of the present invention.

An electrode which is highly specific for the conversion of oxygen to hydrogen peroxide in acid media includes a platinum surface which has been modified by sulfur, tellurium, or selenium, or compounds including these elements. These substances (collectively referred to herein as modifiers), when present on the platinum surface either in their elemental form, or as compounds, have been found to poison the platinum surface. The poisoning of the surface inhibits the conversion of oxygen to water (a four electron process) and favors the conversion of oxygen to hydrogen peroxide (a two electron process). The high selectivity of the electrode formed from the modified platinum, and its ability to function in acid media, make the electrode suitable to a variety of applications, including the production of hydrogen peroxide in acidic electrolytes and the concentration of oxygen.

To form the electrode, a platinum substrate surface is modified with a modifier which increases the selectivity of the electrode for the conversion of oxygen to hydrogen peroxide. Preferred modifiers include sulfur, tellurium, selenium, their inorganic sulfides, tellurides, and selenides, organic derivatives, and combinations thereof. Sulfur compounds are particularly preferred modifiers for platinum. The sulfur may be introduced to the platinum surface as hydrogen sulfide gas, as an inorganic sulfide in solution, such as sodium sulfide, or as an organic derivative, such as a thiol or other organic derivative with an —SH functional group. For example, natural gas contains a small proportion of a thiol which acts as a suitable modifier.

In the case of a gas, such as hydrogen sulfide or natural gas, the platinum surface is exposed to a stream of the gas for a short period of time. In the case of a liquid, such as sodium sulfide solution, the platinum surface is immersed in the liquid or the liquid is placed on the surface for a short period of time, such as around 30 seconds. The excess liquid is then removed from the surface by suction and/or rinsing with water. Tellurium and Selenium modifiers may be introduced to the surface in a similar manner.

The modifier (sulfur, tellurium, selenium, or their compounds) forms a modified surface layer on the platinum which is around 1 monolayer thick or less. The exact nature of the surface layer is not fully understood, however, it may be a layer of elemental sulfur, tellurium, selenium, or of a compound of these elements. A preferred coverage for the modified surface layer is 0.2 to 0.9 monolayers.

The coverage of the modified layer influences the efficiency of the electrode. To reduce the coverage of the modified surface layer after deposition, the layer can be partially removed by oxidation. This is readily achieved by polarizing the modified platinum electrode at a high potential for a short period of time.

The platinum substrate preferably has a high surface area for providing a large area for oxygen to be reduced to hydrogen peroxide. Platinum surfaces with a surface area of 100 $m^2/gm$ or above are particularly preferred.

The surface modified platinum provides a suitable electrode material for highly selective conversion of oxygen to hydrogen peroxide. The modified platinum is compatible with acidic media and thus can be incorporated into electrochemical cells employing acidic electrolytes. To generate hydrogen peroxide, the electrode is used as a cathode of an electrochemical cell. A current is applied to the cathode of the cell to supply electrons for the reduction of oxygen to hydrogen peroxide at the cathode.

The power consumption of the cell is dependent on the potential which is applied between an anode of the cell and the cathode in order to sustain the applied current (power=current×voltage). Thus a low applied potential is desired in such a cell. For a sulfur modified platinum electrode, the potential was found to be at least 200 mV less than that required for a polycrystalline gold electrode in a sulfuric acid electrolyte. This indicates that the power consumption of the sulfur modified electrode is less than for a gold electrode.

The selectivity of the modified platinum has been found to be about 100%, to within experimental error, indicating that all, or virtually all of the oxygen which reacts on the surface is being converted to hydrogen peroxide (or to the equivalent $HO_2^-$ ion), rather than to other oxygen-containing species, such as water. The selectivity for this conversion reaction is maintained, even when the surface is partially deactivated and the rate of the conversion reaction is diminished.

Accordingly, the modified platinum is well suited to the production of hydrogen peroxide and also to incorporation into a highly efficient oxygen concentrator, in which the hydrogen peroxide formed at the cathode electrode is subsequently reconverted to oxygen at an anode. It should be appreciated, however, that the modified platinum is also suited to other applications, such as the removal of traces of oxygen from an environment which is desired to be oxygen free.

With reference to FIG. 1, an oxygen concentrating device takes advantage of the highly specific modified platinum electrode for conversion of oxygen to hydrogen peroxide in an acidic electrolyte. A feed gas containing a low concentration of oxygen is fed to a cathodic electrode 10 of the device. The oxygen in the feed gas is selectively reduced at the cathode according to a two electron process to form peroxide. The device also includes an anodic electrode 12 and a thin separator 14.

The cathode 10 is formed from a high surface area platinum modified with sulfur, tellurium, or selenium, as described above, and is highly selective for the reduction of oxygen to peroxide.

Preferred separators are solid polymer electrolyte (SPE) separator materials which provide both an ion-selective membrane and an acidic electrolyte for transporting hydrogen peroxide. The separator 14 itself may be a microporous material, or it may be an ion-exchange membrane wetted with an aqueous electrolyte. The separator is one which is permeable to hydrogen peroxide and/or to $HO_2^-$ ions. Preferably, the separator is impermeable to components of the atmosphere, such as nitrogen. Preferred separators include an ion-selective separator material, such as a thin (0.30 mm) perfluorinated sulfonic acid membrane (obtainable from DuPont under the trade name Nafion), or other ionically conducting polymers. The perfluorinated sulfonic acid membrane acts as both a separator and an acidic electrolyte. The peroxide is transferred through the separator 14 and oxidized at the anode to form concentrated oxygen according to a two electron process.

The anode 12 of the electrochemical oxygen concentrating device of the present invention may comprise an adherent coating formed from fuel cell-type gas diffusion electrode components on the solid polymer electrolyte (SPE) separator material. Suitable materials for the anode include high surface area platinum.

The feed gas can comprise ambient air, or it can be supplied by an environment incompatible with life support (such as, for example, an environment too high in carbon dioxide content for human habitation). On a molar basis, air typically contains about 21% oxygen and 79% nitrogen.

As shown in FIG. 1, the feed gas including oxygen is optionally fed to the cathode 10 through an inlet 16 and a gas distributor plate 18. The plate 18 is formed from a porous material, such as carbon. A sulfur modified surface layer 20 (not to scale) on the high surface area platinum substrate is in contact with the separator 14. The cathode 10 is thus sandwiched between the distributor plate 18 and the separator.

A source of a potential difference 22 is connected between the anode and the cathode to apply a potential to the cathode. The peroxide formed at the cathode diffuses or migrates through the separator 14 to the anode 12. The feed gas which has been depleted of oxygen remains on the cathode side of the concentrator and is transported out of the concentrator through an exit gas outlet 24.

At the anode 12, the peroxide is oxidized to form purified oxygen. The purified oxygen (which comprises about 95% or greater of oxygen) passes through a second distributor plate 26 and is withdrawn through a purified gas outlet 28.

The reaction taking place at the cathode is as follows:

$$O_2 + 2H^+ + 2e^- \rightarrow H_2O_2 \quad E° = 0.695 \text{ V}$$

At the anode, the following reaction takes place:

$$H_2O_2 \rightarrow O_2 + 2H^+ + 2e^-$$

or $$HO_2^- \rightarrow O_2 + 2H^+ + 2e^-$$

Since electrolyte pumping costs are eliminated by the device discussed herein, the energy efficiency of the present development may be greater than 90%. An estimated specific power requirement assuming a cell voltage of 0.4 V at 100 mA/cm² is about 40–50 W/kg $O_2$ per day. The subject new device delivers oxygen at high pressure, if needed, by back pressuring both sides of the composite. The oxygen concentrator of the subject new development is operable either continuously or cyclically.

It will be appreciated that a device for production of hydrogen peroxide can be similarly formed. The device includes a cathode formed from the modified platinum, as described above. Oxygen, or an oxygen-containing feed gas, is brought into contact with the cathode. The hydrogen peroxide formed is transported through a separator of the type described or is released into a liquid electrolyte, such as an acidic solution, surrounding the cathode.

Without intending to limit the scope of the invention, the following examples demonstrate the selectivity of a modified platinum substrate and the retention of the selectivity over time.

EXAMPLE 1

Figure 2:
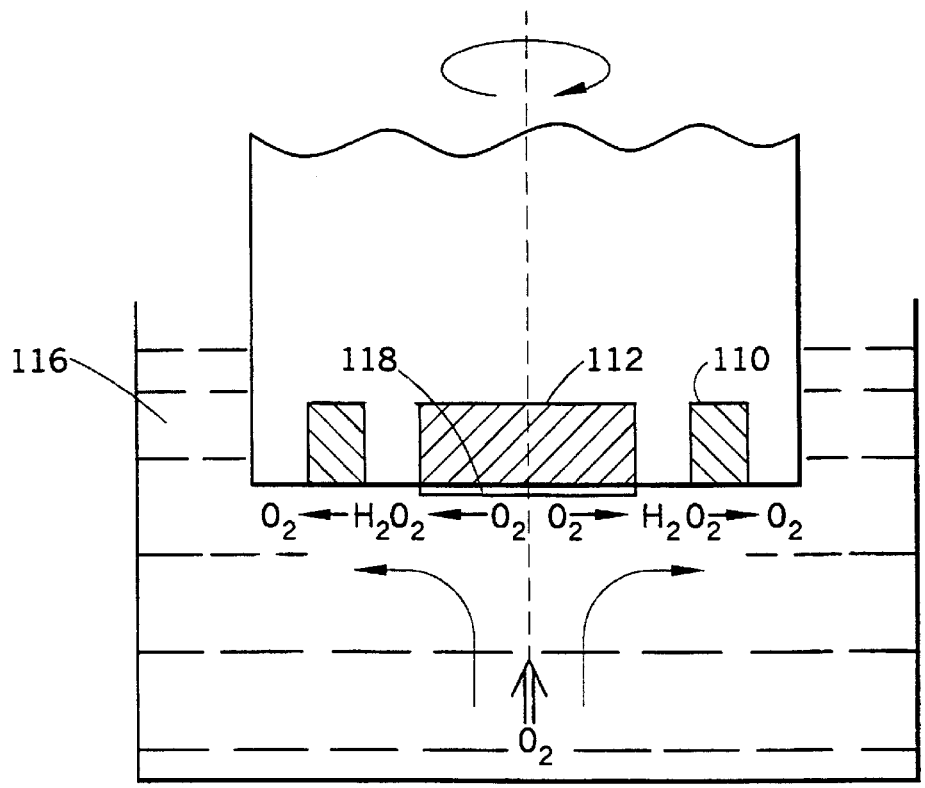
FIG. 2 is a schematic representation of a side section of a ring-disk electrochemical cell formed in accordance with a second embodiment of the present invention.
Figure 3:
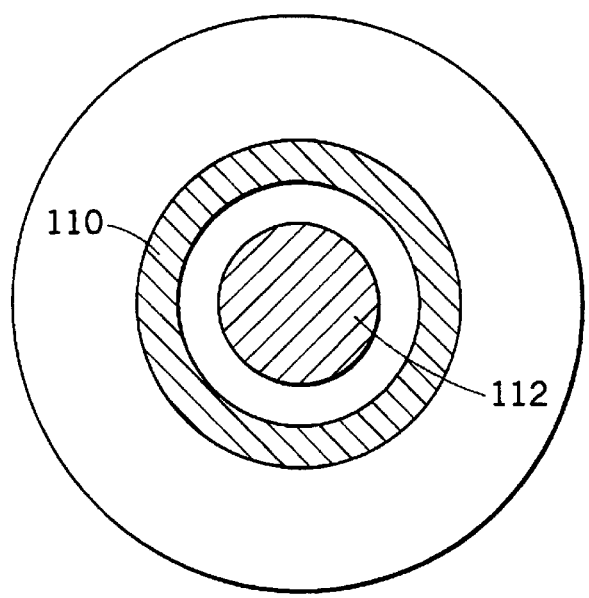
FIG. 3 is a top view of the ring-disk electrochemical cell of FIG. 2.

Oxygen Reduction on Sulfur-Modified Platinum in Phosphoric Acid Electrolytes: Rotating Ring-Disk Studies The reduction of oxygen on both bare and S-modified Pt in 0.10 M $H_3PO_4$ solutions (J. T. Baker Ultrex II reagent $H_3PO_4$ diluted with ultrapure water generated by a Barnstead EASY pure UV compact system) was examined at room temperature with an electrochemical cell comprising a Pt—Pt rotating ring-disk electrode (RRDE) of the type shown schematically in FIGS. 2 and 3. For these experiments a Pt ring 110 was set at +1.4 V vs a reversible hydrogen electrode (RHE) to oxidize quantitatively $H_2O_2$ generated at the disk. Measurements were performed in the dynamic polarization mode at a scan rate of 10 mV/s using a Pine bi-potentiostat in a conventional three-compartment electrochemical cell.

The RRDE electrode was polished with a polishing cloth using 0.05 μ α-$Al_2O_3$(obtained from BUEHLER Ltd.). A series of cyclic voltammograms were recorded for a disk 112 and the ring 110 separately at a scan rate of 50 mV/s in a nitrogen purged 0.10M $H_3PO_4$ electrolyte solution 116, under rotation to check for the cleanliness of the electrode and the solution. The 0.10M $H_3PO_4$ electrolyte solution 116 was then saturated with oxygen by purging for about 1.5 hours.

The sulfur modification of the platinum surface was achieved by placing a drop of a 50 mM $Na_2S$ (reagent grade, obtained from Fisher Scientific) aqueous solution onto the platinum disk electrode 112 without touching the ring. After thirty seconds, the drop was removed by suction, leaving a modified layer 118 containing sulfur on the electrode (not shown to scale). The modified surface was then rinsed with pure water and the electrode introduced into the oxygen saturated electrolyte. Prior to the dynamic polarization measurements, the high activity of the ring 110 was verified by cycling the potential between +0.04 and 1.5V vs RHE.

Figure 4A:
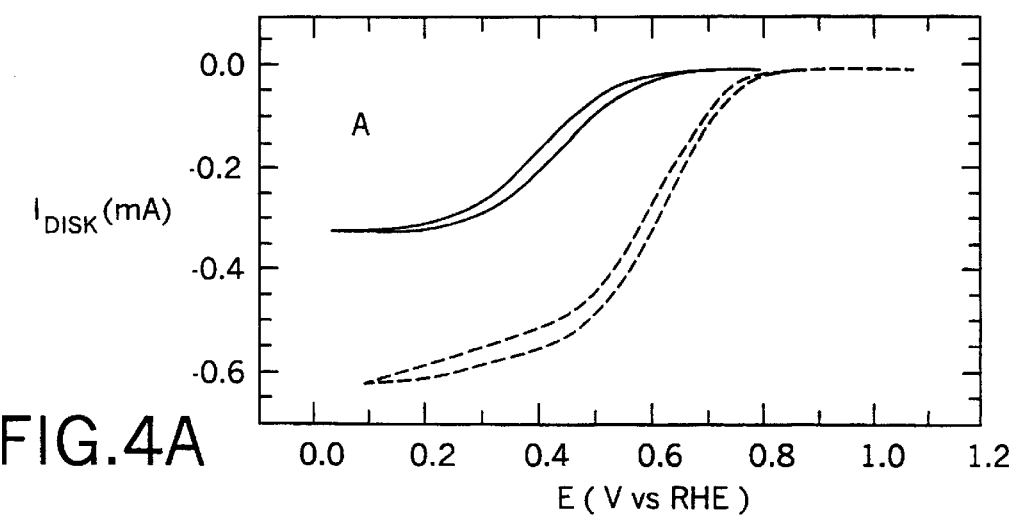
FIGS. 4A–C show plots of dynamic polarization measurements obtained for a Pt—Pt rotating ring-disk electrode obtained for a bare Pt disk electrode(dashed line) and a sulfur-modified Pt disk electrode(solid line) in an $O_2$ saturated 0.10 M $H_3PO_4$ solution, as follows.
Figure 4B:
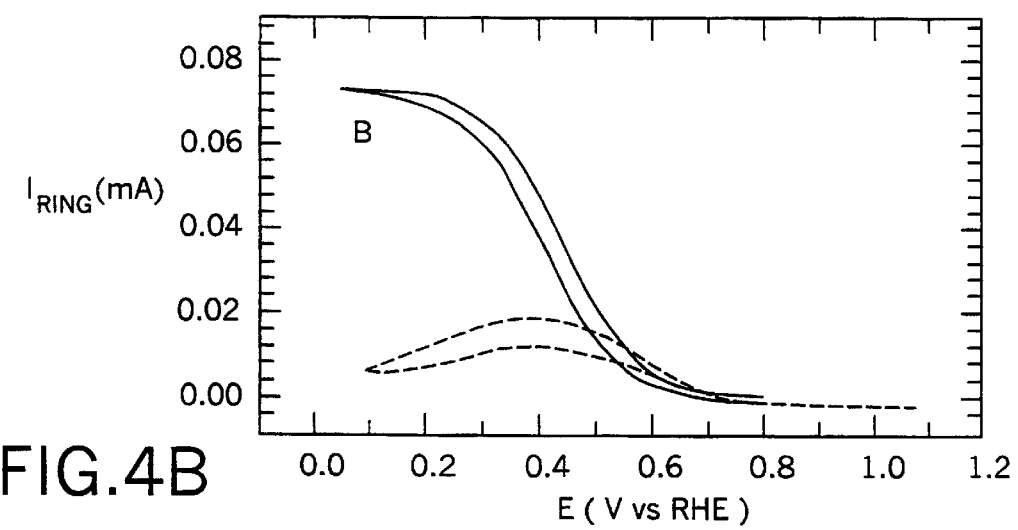

FIG. 4A shows the disk currents obtained during dynamic polarization measurements for oxygen reduction on a bare (dashed line) and sulfur-modified (solid line) platinum disk electrode at a rotation rate of 900 rpm. FIG. 4B shows the equivalent currents for the platinum ring electrode. As clearly indicated by the plots, the sulfur modification gives rise to a marked increase in the amount of hydrogen peroxide collected by the ring when compared with the bare platinum surface.

Figure 4C:
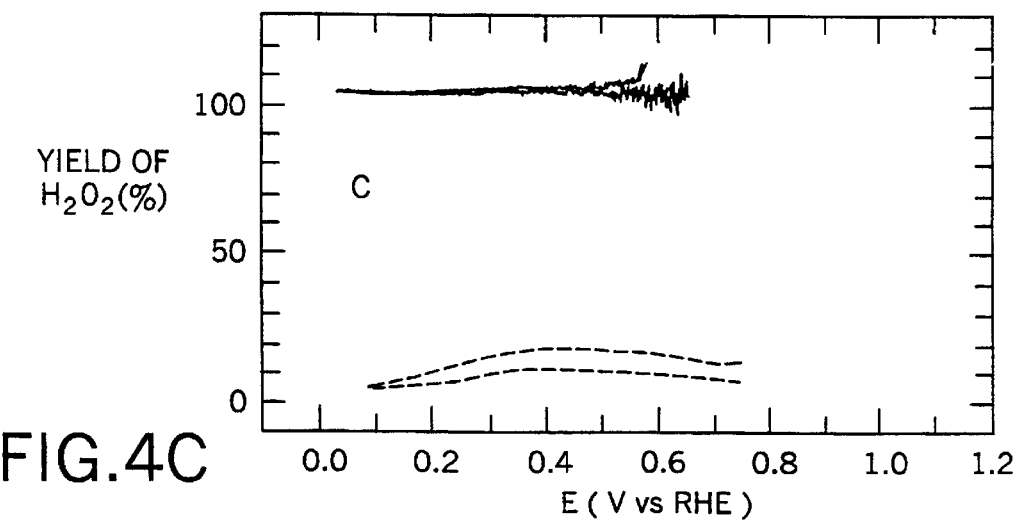

The ring and disk current data make it possible to determine quantitatively the yield of hydrogen peroxide generation at the disk via the formula:

$$\text{Yield } (\%) = N(I_{Ring}/I_{Disk}) \times 100\%$$

where $I_{Ring}$ and $I_{Disk}$ represent the ring and disk currents, respectively, and N is the collection coefficient of the RRDE assembly. The latter was calculated using a standard method based on the geometric parameters of the electrodes ($OD_{Ring}$=0.2120", $ID_{Ring}$=0.1940" and $OD_{Disk}$=0.1800", yielding a value of N=0.216). As shown in FIG. 4C, the peroxide yield was 100%, within experimental error, over the entire potential range. This demonstrates that a platinum electrode modified with sulfur is highly selective for the conversion of oxygen to hydrogen peroxide.

EXAMPLE 2

Figure 5A:
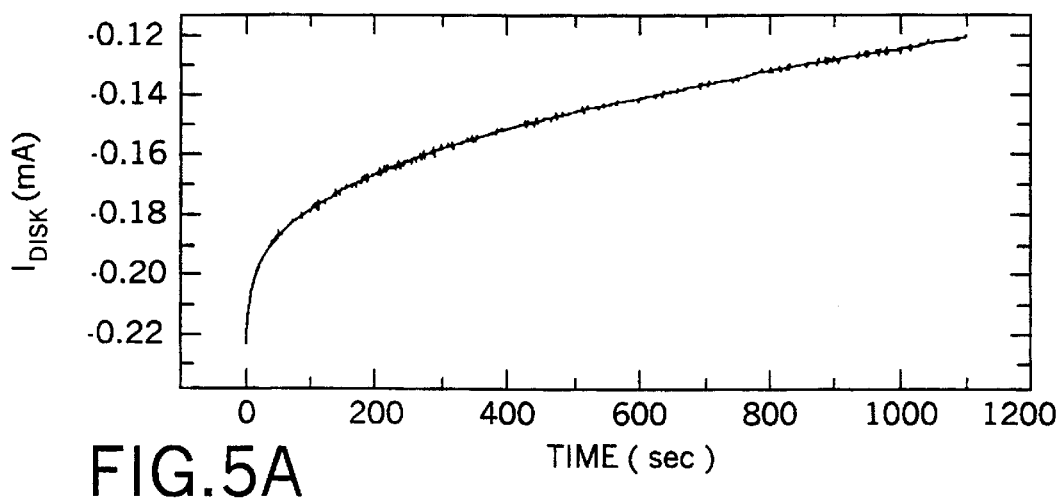
FIGS. 5A–C show plots of $I_{disk}$ (FIG. 5A) $I_{ring}$ (FIG. 5B) and the corresponding $I_{ring}/I_{disk}$ ratio (FIG. 5C) as a function of time obtained after polarizing the disk electrode at +0.20V.
Figure 5B:
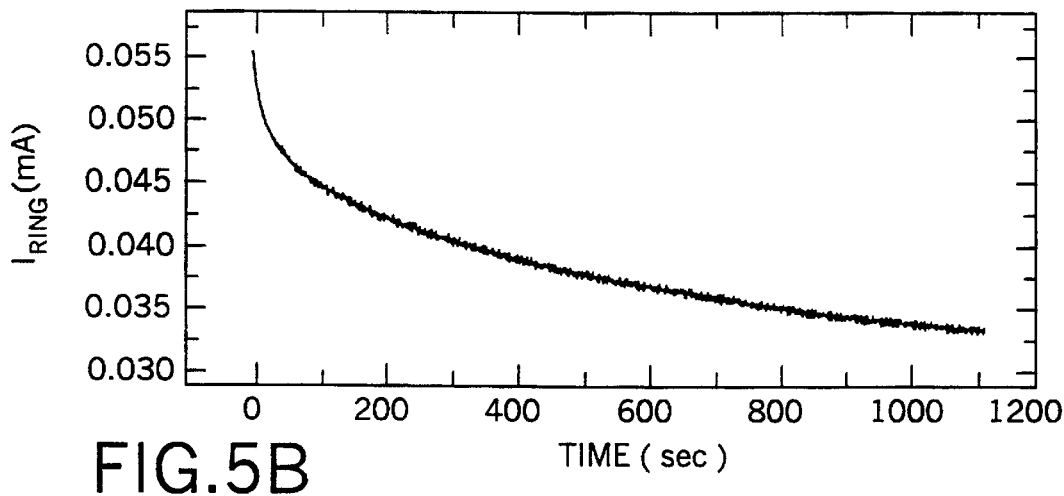

Oxygen Reduction on Sulfur-Modified Platinum in Phosphoric Acid Electrolytes: Rotating Ring-Disk Time Studies A rotating ring disk electrode was prepared as for Example 1 with a sulfur-modified platinum disk electrode. After cycling, the activity of the disk was determined by scanning the disk in the range of 0.2V to less than 1.2V until it reached maximum activity. The ring and disk currents were monitored over a period of about 20 minutes. FIGS. 5A and 5B show the measured disk and ring currents, respectively. It can be seen that the ring and disk currents both showed a rapid change during the first 100 seconds, and slower, but similar changes at longer times.

Figure 5C:
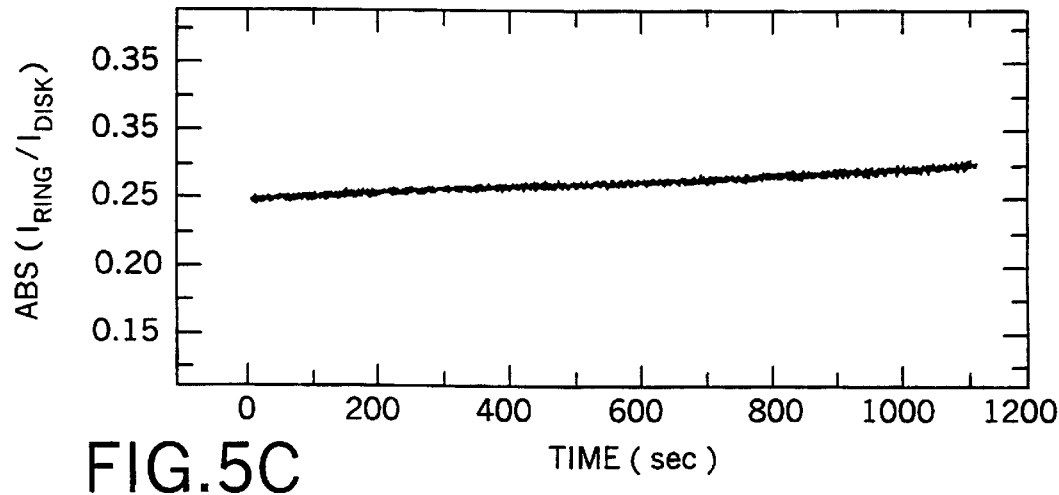

FIG. 5C shows the ratio of ring to disk current over time. It can be seen that the ratio remained virtually unchanged over time, indicating that electrode deactivation does not result in loss of specificity.

Having thus described the preferred embodiment, the invention is now claimed to be:

1. An electrode (10,112) which is selective for reduction of oxygen, the electrode comprising a substrate which includes platinum, the electrode characterized by:

the substrate having a surface modified with a layer (118) of a substance selected from the group consisting of sulfur, selenium, and tellurium, compounds of sulfur, selenium, and tellurium, and combinations thereof.

2. The electrode of claim 1, further characterized by:

the substance including a sulfur compound selected from the group consisting of hydrogen sulfide, soluble inorganic sulfides, organic sulfur compounds which include an —SH functional group, and combinations thereof.

3. The electrode of claim 1, further characterized by:

the modified surface layer providing a coverage of 1 monolayer or less.

4. The electrode of claim 3, further characterized by:

the coverage of the modified surface layer being 0.2–0.9 monolayers.

5. The electrode of claim 1, further characterized by:

the electrode having a specificity for conversion of oxygen to hydrogen peroxide of about 100%.

6. An electrochemical cell (A, B) comprising the electrode of claim 1.

7. An electrochemical device (A) for concentrating oxygen from a feed gas including oxygen, the electrochemical device comprising a cathode (10) for reducing oxygen in the feed gas to peroxide, an anode (12) for oxidizing the peroxide to oxygen, a separator (14) between the anode and the cathode for selectively diffusing the peroxide therethrough, and a source of a potential difference (22) connected with the cathode and the anode, the device characterized by:

the cathode (10) including a platinum-containing substrate which has a surface modified with a substance selected from the group consisting of sulfur, selenium, and tellurium, compounds of sulfur, selenium, and tellurium, and combinations thereof.

8. The device of claim 7, further characterized by:

an acidic electrolyte (14) in contact with the cathode.

9. A method of converting oxygen in an oxygen-containing atmosphere to peroxide with a high degree of specificity, the method characterized by:

modifying a surface of a platinum-containing electrode (10, 112) with a substance selected from the group consisting of sulfur, selenium, and tellurium, compounds of sulfur, selenium, and tellurium, and combinations thereof; and, contacting the modified electrode surface with the atmosphere.

10. The method of claim 9, further characterized by:

the step of modifying the surface including providing a layer (20, 118) of the substance on the electrode surface, the layer having a coverage of about 0.2 to about 0.9 monolayers.

* * * * *